United States Patent
Pefkianakis et al.

(10) Patent No.: US 10,708,154 B2
(45) Date of Patent: Jul. 7, 2020

(54) OCCUPANCY SENSING (71) Applicant: Hewlett Packard Enterprise Development LP, Houston, TX (US)

(72) Inventors: Ioannis Pefkianakis, Palo Alto (CA); Abhinav Parate, Palo Alto, CA (US); Shruti Sanadhya, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 198 days.

(21) Appl. No.: 15/750,601

(22) PCT Filed: Aug. 27, 2015

(86) PCT No.: PCT/US2015/047200
§ 371 (c)(1),
(2) Date: Feb. 6, 2018

(87) PCT Pub. No.: WO2017/034578
PCT Pub. Date: Mar. 2, 2017

(65) Prior Publication Data
US 2019/0020556 A1  Jan. 17, 2019

(51) Int. Cl.
*H04L 12/26* (2006.01)
*H04L 12/911* (2013.01)
(Continued)

(52) U.S. Cl.
CPC .......... *H04L 43/062* (2013.01); *G06Q 10/06* (2013.01); *H04L 43/067* (2013.01); *H04L 43/16* (2013.01);
(Continued)

(58) Field of Classification Search
CPC ........ G06N 20/00; G06N 5/04; Y04S 20/227; Y02B 70/3241; H04L 43/062;
(Continued)

(56) References Cited

U.S. PATENT DOCUMENTS 8,315,896 B2  11/2012  Tennefoss
2011/0057581 A1  3/2011  Ashar et al.
(Continued)

FOREIGN PATENT DOCUMENTS

WO  20141120180 A1  8/2014

OTHER PUBLICATIONS

Wikipedia, "Association Rule Learning", (webpage), available online at <https://en.wikipedia.org/w/index.php?title=Association_rule_learning&oldid=671306478>, Jul. 13, 2015, 12 pages.
(Continued)

*Primary Examiner* — Soe Hlaing
(74) *Attorney, Agent, or Firm* — Hewlett Packard Enterprise Patent Department (57) ABSTRACT

Example implementations may relate to an occupancy sensing system. For example, the occupancy sensing system may collect connection data and traffic data related to electronic devices that connect to the networking device. The occupancy sensing system may determine a number of resident devices and a number of high-traffic devices, based on the connection data or the traffic data. The occupancy sensing system may determine a number of the electronic devices that are coactive within an analysis time window, and may constrain the number of coactive electronic devices to a range from the number of high-traffic devices to the number of resident devices to generate an occupancy value.

20 Claims, 5 Drawing Sheets

(51) Int. Cl.
| | |
|---|---|
| H04L 29/08 | (2006.01) |
| H04W 4/021 | (2018.01) |
| G06Q 10/06 | (2012.01) |
| H04W 8/00 | (2009.01) |
| H04W 48/06 | (2009.01) |
| H04W 48/16 | (2009.01) |

(52) U.S. Cl.
CPC .............. *H04L 47/70* (2013.01); *H04L 67/22* (2013.01); *H04L 67/24* (2013.01); *H04W 4/021* (2013.01); *H04W 8/005* (2013.01); *H04W 48/06* (2013.01); *H04W 48/16* (2013.01)

(58) Field of Classification Search
CPC ......... H04L 67/24; H04L 67/22; H04L 47/40; H04L 43/16; H04L 43/067; G06Q 10/06; H04W 4/021; H04W 48/16; H04W 48/06; H04W 8/005
See application file for complete search history.

(56) References Cited

U.S. PATENT DOCUMENTS

| | | | |
|---|---|---|---|
| 2012/0066168 A1* | 3/2012 | Fadell | G05B 15/02 706/52 |
| 2012/0276517 A1 | 11/2012 | Banaszuk et al. | |
| 2013/0289952 A1* | 10/2013 | Marwah | G06Q 10/04 703/2 |
| 2015/0006463 A1 | 1/2015 | Fadell et al. | |
| 2015/0111575 A1 | 4/2015 | Lei et al. | |

OTHER PUBLICATIONS

VonNeida et al., "An Analysis of the Energy and Cost Savings Potential of Occupancy Sensors for Commercial Lighting Systems", Journal of the Illuminating Engineering Society vol. 30, Issue 2, 2001, 27 pages.

Rosenblum et al., "A Framework for Evaluating the Compatibility of Occupant Presence Data Sources with Energy Management Strategies", Proceedings of the Aceee Summer Study on Energy Efficiency in Buildings, 2012, pp. 12-235-12-250.

Meyn et al., "A Sensor-Utility-Network Method for Estimation of Occupancy Distribution in Buildings", Proceedings of the 48th IEEE Conference on IEEEM, Dec. 2009, 8 pages.

Melfi et al., "Measuring building occupancy using existing network infrastructure", International Green Computing Conference and Workshops, 2011, 8 pages.

Li et al., "Demo Abstract: A Wi-Fi Based Occupancy Sensing Approach to Smart Energy in Commercial Office Buildings", BuildSys '12, Proceedings of the Fourth ACM Workshop on Embedded Sensing Systems for Energy-Efficiency in Buildings, Nov. 6, 2012, pp. 197-198.

Kamthe et al., "SCOPES: Smart Cameras Object Position Estimation System", In: Roedig U., Sreenan C.J. (eds) Wireless Sensor Networks, EWSN 2009, Lecture Notes in Computer Science, vol. 5432, 2009, pp. 279-295.

International Search Report and Written Opinion received for PCT Patent Application No. PCT/US2015/047200, dated May 19, 2016, 9 pages.

International Preliminary Report on Patentability received for PCT Patent Application No. PCT/US2015/047200, dated Mar. 8, 2018, 8 pages.

Hutchins et al., "Modeling Count Data from Multiple Sensors: A Building Occupancy Model", 2nd IEEE International Workshop on Computational Advances in Multi-Sensor Adaptive Processing, 2007, 4 pages.

Harris et al., "Power Management for Stationary Machines in a Pervasive Computing Environment", Proceedings of the 38th Hawaii International Conference on System Sciences, Jan. 2005, pp. 1-10.

Harle et al., "The Potential for Location-Aware Power Management", UbiComp'08, Sep. 21-24, 2008, 10 pages.

Dalton et al., "Sensing User Intention and Context for Energy Management", Proceedings of the 9th conference on Hot Topics in Operating Systems, vol. 9, Feb. 23, 2003, 5 pages.

Capkun, Anthony, "Smart devices can track building occupants to manage energy consumption", (webpage), Energy Manager, available online at <http://www.energy-manager.ca/industry-news/smart-devices-can-track-building-occupants-to-manage-energy-consumption.html>, Dec. 6, 2013, 6 pages.

Bhasker et al., "Employing User Feedback for Fast, Accurate, Low-Maintenance Geolocationing", Proceedings of the Second IEEE Annual Conference on Pervasive Computing and Communications, 2004, 10 pages.

* cited by examiner

OCCUPANCY SENSING

BACKGROUND

Occupancy levels in a building, whether an office building, a residence, a place of commerce, or other buildings, may vary over time. Various systems of a building may be adjusted in response to changes in occupancy levels. For example, lighting systems may be turned down or off when a building or a portion thereof is unoccupied.

BRIEF DESCRIPTION OF THE DRAWINGS

Various examples will be described below with reference to the following figures.

Throughout the drawings, identical reference numbers may designate similar, but not necessarily identical, elements. Additionally, an index number "N" appended to some of the reference numerals may be understood to merely denote plurality and may not necessarily represent the same quantity for each reference numeral.

DETAILED DESCRIPTION

Occupancy of buildings may vary over time. Additionally, occupancy may depend on the type of building. For example, occupancy of an office building may be higher during working hours (e.g., 9:00 a.m. to 5:00 p.m.) and lower during non-working hours. Conversely, occupancy of a residence may be lower during working hours and higher during non-working hours. A determination or estimation of occupancy levels may be useful for dynamically managing energy consumption of a building. Some occupancy detection or estimation methods utilize dedicated hardware, such as passive infrared sensors, ultrasonic motion sensors, carbon dioxide sensors, video cameras, sound recorders, etc. Use of such dedicated hardware may carry installation and maintenance costs, and also may be inaccurate. Additionally, some occupancy detection systems may utilize high data sampling rates or complex data processing, which may be computationally or financially costly to implement.

The systems and techniques of the present application may, in some example implementations, collect implicit information from networking devices, such as connection data and traffic data related to electronic devices that connect to a networking device. The connection data or traffic data may be used to determine a number of the electronic devices that are coactive. Because electronic devices may be operated by the occupants of a building, determination of a number of coactive electronic devices may be an estimation or proxy for a number of occupants in the building. The connection data or traffic data also may be used to determine a lower bound and an upper bound to constrain the number of coactive electronic devices. For example, the lower bound may be the number of electronic devices that account for a particular percentage (e.g., a majority) of traffic at the networking device, and the upper bound may be the number of electronic devices that connect to the networking device with greater frequency or duration than others of the electronic devices. Accordingly, the systems and techniques of the present application may be useful for determining an occupancy of a building using information implicit to communications between electronic devices and networking devices.

Moreover, such an occupancy determination may further be useful for adjusting facility systems, such as heating, ventilation, and air conditioning (HVAC) systems or lighting systems, when a building or portion thereof is unoccupied or has reduced occupancy for example. Additionally, an occupancy determination may be useful for security purposes, for example, by determining whether a building or portion thereof is occupied when it is not expected to be. Although some aspects of the present application are described with respect to buildings, it may be understood that the systems and techniques described herein are not limited to buildings, but may be useful for determining occupancy of any physical space where networking devices are employed, such as outdoor spaces or semi-enclosed spaces.

Figure 1:
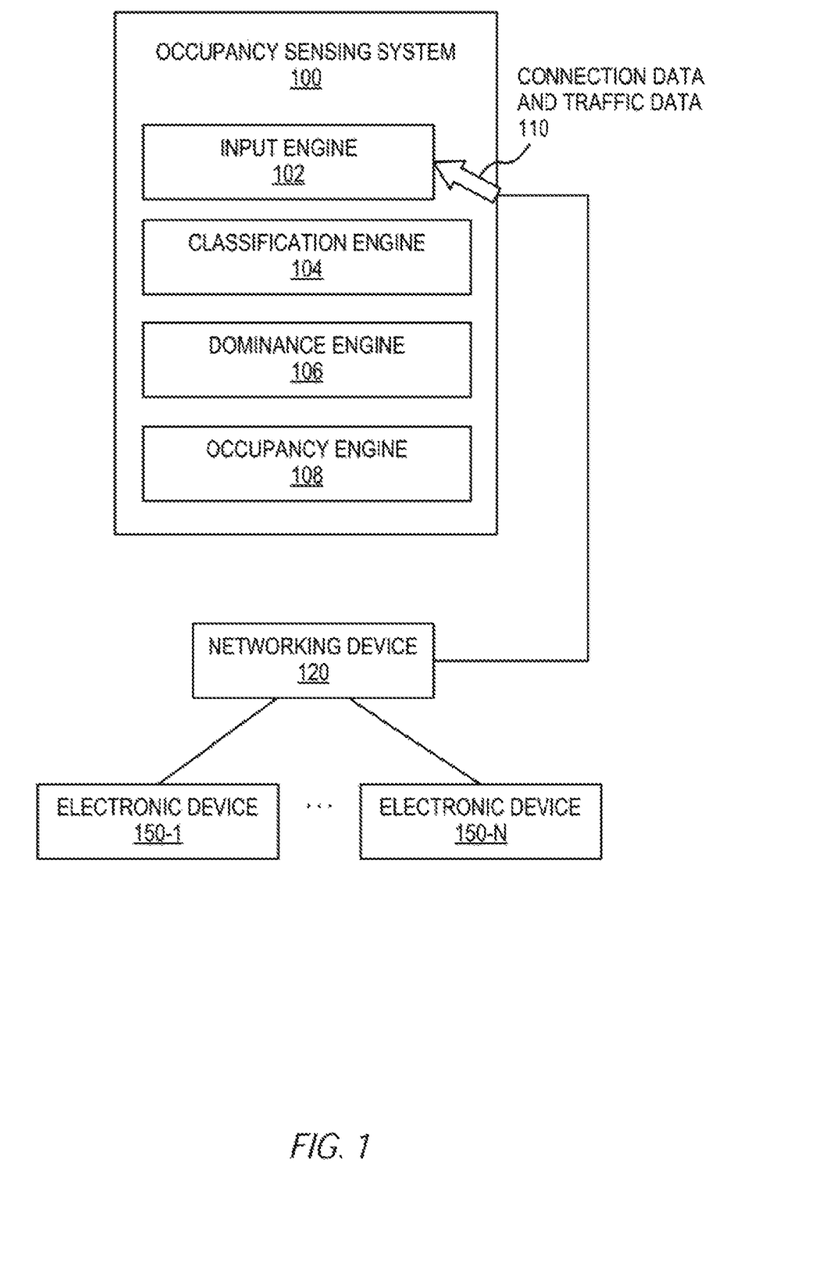
FIG. 1 is a block diagram of an example occupancy sensing system, according to an implementation.

Referring now to the figures, FIG. 1 is a block diagram of an example occupancy sensing system 100, according to an example implementation. The occupancy sensing system 100 may communicate with a networking device 120 by way of, for example, a bus or a wired or wireless network. For example, the networking device 120 may be an access point, a gateway, a router, or the like. Moreover, the networking device 120 may communicate with electronic devices (e.g., 150-1 through 150-N), which may include, for example, a computer (e.g., a laptop, a desktop, a workstation, a server, etc.), a mobile phone, a tablet computing device, a wearable electronic device, a gaming device, or the like. The electronic devices 150-1 through 150-N and the networking device 120 may communicate using any wired or wireless communications technology (e.g., Ethernet, USB, optical fiber, FireWire®, Thunderbolt™, Wi-Fi®, Bluetooth®, ZigBee®, infrared communications, or the like). In some implementations, the electronic devices 150-1 through 150-N may connect to the networking device 120 in order to reach a local area network, a wide area network, a private cloud, a public cloud, the Internet, or the like.

In some implementations, the networking device 120 may track or monitor connection data, such as the identity of electronic devices 150-1 through 150-N that connect to the networking device 120 (e.g. a MAC address of the electronic device or other identifier), connections or disconnections by the electronic devices 150-1 through 150-N, and durations of connections to the electronic devices 150-1 through 150-N. The networking device 120 also may track or monitor traffic data, such as the amounts and types of traffic related to each of the electronic devices 150-1 through 150-N (e.g., uplink and/or downlink traffic, in bits per second). The networking device 120 may sample or aggregate connection data or traffic data for each electronic device on an interval (or scheduled) basis, such as at intervals on the order of minutes (e.g., or another interval configurable at the networking device 120), and may store the connection data or the traffic data in a log file, for example.

The occupancy sensing system 100 may include an input engine 102, a classification engine 104, a dominance engine 106, and an occupancy engine 108, which may be components that perform predetermined tasks and/or routines. In some implementations, the occupancy sensing system 100 may include a machine-readable medium (e.g., random access memory, electrically erasable programmable read-only memory, flash memory, hard disk drives, optical discs, or the like) and processor(s) (e.g., a microprocessor, an application-specific integrated circuit, a field programmable gate array, and/or other hardware device suitable for retrieval and/or execution of instructions), and the engines 102, 104, 106, 108 may be implemented as instructions stored or encoded on the machine-readable medium and executable by the processor(s) to perform the processes and functionality described herein. Additionally or alternatively, the engines 102, 104, 106, 108 may be implemented as hardware devices such as logic circuits, electronic circuitry, or the like.

The input engine 102 may collect, from the networking device 120, connection data and traffic data 110 related to electronic devices 150-1 through 150-N that connect to the networking device 120. For example, in some examples, the networking device 120 may include an application programming interface (API) that exposes a function call or calls by which clients, including the occupancy sensing system 100 and the input engine 102 in particular, may poll or request connection data and traffic data 110. In some implementations, the input engine 102 may collect the connection data and the traffic data at intervals, which may be, for example, on the same order as the interval at which the networking device 120 samples or aggregates connection data and traffic data. The input engine 102 may store the collected connection data and traffic data (as historical data) in storage or memory of the occupancy sensing system 100, for example, and the occupancy sensing system 100 and engines thereof may analyze various amounts of the data and for various processes as will be described below.

The classification engine 104 may differentiate the electronic devices 150-1 through 150-N into resident devices and transient devices based on the connection data or the traffic data. In some implementations, the classification engine 104 may differentiate the electronic devices 150-1 through 150-N by classifying as resident devices the electronic devices for which corresponding connection data indicates that frequency or duration of connection to the networking device 120 exceed predetermined frequency or duration thresholds.

For example, the classification engine 104 may analyze the connection data to determine, for each of the electronic devices 150-1 through 150-N, the number of times the electronic device connected to the networking device 120 (i.e., a connection frequency) or a cumulative amount of time the electronic device connected to the networking device 120 (i.e., a connection duration). The classification engine 104 may deem an electronic device to be a resident device if its connection frequency or connection duration is greater than (or equal to) a threshold and may deem an electronic device to be a transient device if its connection frequency or connection duration is less than the threshold. The classification engine 104 also may determine a number (quantity) of the resident devices, and in some implementations, the number of the resident devices may be deemed an upper bound.

In some implementations, the connection data used by the classification engine 104 to differentiate the electronic devices 150-1 through 150-N may have been collected by the input engine 102 over a time period on the order of days, weeks, or months for example (also referred to herein as the classification time period for convenience), and a longer period may, in some cases, accentuate contrast in the connection frequency or connection duration between resident and transient devices.

The foregoing classification time period or the foregoing threshold may be settings that are preconfigured (preprogrammed) for the classification engine 104. In other implementations, the time period or the threshold may be configurable, through a web-based configuration interface of the occupancy sensing system 100 for example. For example, a connection duration threshold may be seven days within a time period of one month, which may filter out the electronic devices that only connect sporadically to the networking device 120 (and thus filter out visiting occupants). In some implementations, the time period or the threshold may be optimized manually (e.g., by receiving a user-selected threshold based on a presentation of the connection frequency and duration), automatically (e.g., based on percentiles, a mean, a median, a cumulative density function, etc.), or semi-automatically. Other methods, such as various heuristic algorithms, also may be implemented by the classification engine 104 to identify resident devices.

The dominance engine 106 may determine a number of high-traffic devices among the electronic devices 150-1 through 150-N, based on the connection data or the traffic data. For example, in some implementations, the dominance engine 106 may calculate, for each of the electronic devices 150-1 through 150-N, aggregated traffic (i.e., both uplink and downlink traffic) over a time period and may compute, as the number of high-traffic devices, a minimum number of the electronic devices 150-1 through 150-N having traffic data that together account for a threshold percentage of total traffic at the networking device 120.

The time period over which traffic is aggregated (which may be referred to herein as the dominance time period for convenience) may be different or similar to the classification time period described above. The dominance time period and the threshold percentage may be preconfigured (preprogrammed) in the dominance engine 106, or may be configurable, through a web-based configuration interface of the occupancy sensing system 100. For example, the threshold percentage may be tuned to different values (e.g., manually or automatically, based on statistics of the traffic data for example) to capture more or less of the electronic devices 150-1 through 150-N as high-traffic devices, and an example threshold percentage may be 90%. The high-traffic devices identified by the dominance engine 106 also may be referred to as dominant devices (by virtue of accounting for a percentage or majority of the traffic at the networking device 120), and the number of high-traffic devices may be deemed a lower bound. Other methods, such as various heuristic algorithms, also may be implemented by the dominance engine 106 to identify high-traffic devices.

The occupancy engine 108 may determine a number of the electronic devices 150-1 through 150-N that are coactive (also referred to herein as the number of coactive devices) in an analysis time window. More particularly, the coactive devices may be defined as a combination of at least some of the electronic devices 150-1 through 150-N that are active together with greater frequency than other combinations of the electronic devices 150-1 through 150-N. An electronic device may be identified as active by the occupancy engine 108 if its corresponding traffic data above a background activity threshold, such as, by example only, one kilobit per second. The background activity threshold may be preconfigured or configurable (e.g., via a web-based configuration interface).

The analysis time window used by the occupancy engine 108 may be different from either the classification time period or the dominance time period described above, and may be preconfigured at the occupancy engine 108 or may be configurable (e.g., via a web-based configuration interface). In some implementations, the analysis time window may be selected (by a user) according to the purpose for which the occupancy value will be used. For example, if the occupancy value is to be used to manage building power consumption (e.g., by controlling HVAC or lighting), the occupancy sensing system 100 may be configured to determine occupancy in consecutive two-hour analysis time windows during and around working hours, and may be configured to determine occupancy in larger consecutive analysis time windows (e.g., four or six hour time windows) outside of working hours.

In some implementations, the occupancy engine 108 may determine the number of coactive devices by employing an association rule miner engine (e.g., included in the occupancy engine 108) that performs at least some aspects of association rule mining (also referred to as association rule learning). For example, the association rule miner engine may calculate frequencies of coactivity of combinations of the active devices over a plurality of sampling time windows within the analysis time window. The sampling time windows may be similar in duration to the intervals at which the input engine 102 collects connection data and traffic data. For example, each sampling time windows may span fifteen minutes.

In the terminology of association rule mining, the electronic devices 150-1 through 150-N may be a set of items $I=\{i_1, i_2, \ldots, i_n\}$, the combination of electronic devices that are active at a particular sampling time window may be a transaction t, and the combinations of active devices over a plurality of sampling time windows may be a set of transactions $T=\{t_1, t_2, \ldots, t_n\}$, where t is a subset of I. The frequencies of the various combinations of active devices represented in the set of transactions T may be a support count (total number of occurrences of a combination) or support (total number of occurrences normalized by the total number of transactions in the set). The occupancy engine 108 may select a combination of active devices that has a highest frequency of coactivity among the combinations (i.e., a maximum support or a maximum support count), and may use the number of electronic devices in that selected combination of active devices having the highest frequency of coactivity as the number of coactive devices. Other metrics of association rule mining, such as confidence, may be implemented to determine frequency of coactivity.

The occupancy engine 108 may determine an occupancy value from the number of coactive devices bounded in a range from a number of resident devices (determined by the classification engine 104) to a number of high-traffic devices (determined by the dominance engine 106). For example, if the number of coactive devices is greater than the number of resident devices, the occupancy value may be set to the number of resident devices. Also, if the number of coactive devices is less than the number of high-traffic devices, the occupancy value is set to the number of high-traffic devices.

Figure 2A:
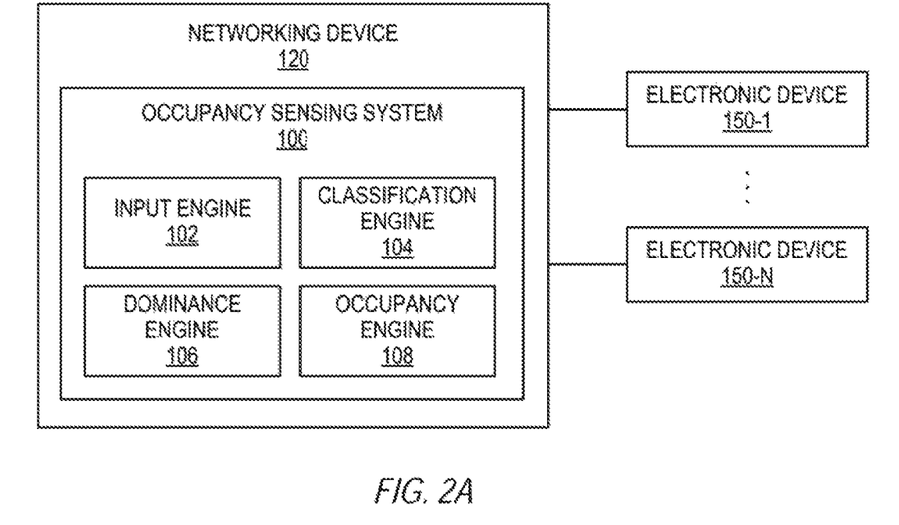
FIG. 2A is a block diagram of an example occupancy sensing system, according to another implementation.

FIG. 2A is an example of the occupancy sensing system 100, according to another example implementation. In FIG. 2A, the occupancy sensing system 100 may be included within the networking device 120. More particularly, the input engine 102, the classification engine 104, the dominance engine 106, and the occupancy engine 108, may be included in the networking device 120. In some cases, a networking device 120 having an on-board occupancy sensing system 100 may be employed in a residence, a small office, or other buildings for which the signal coverage and/or available ports or connections of a few (e.g., one) networking device 120 is sufficient.

Figure 2B:
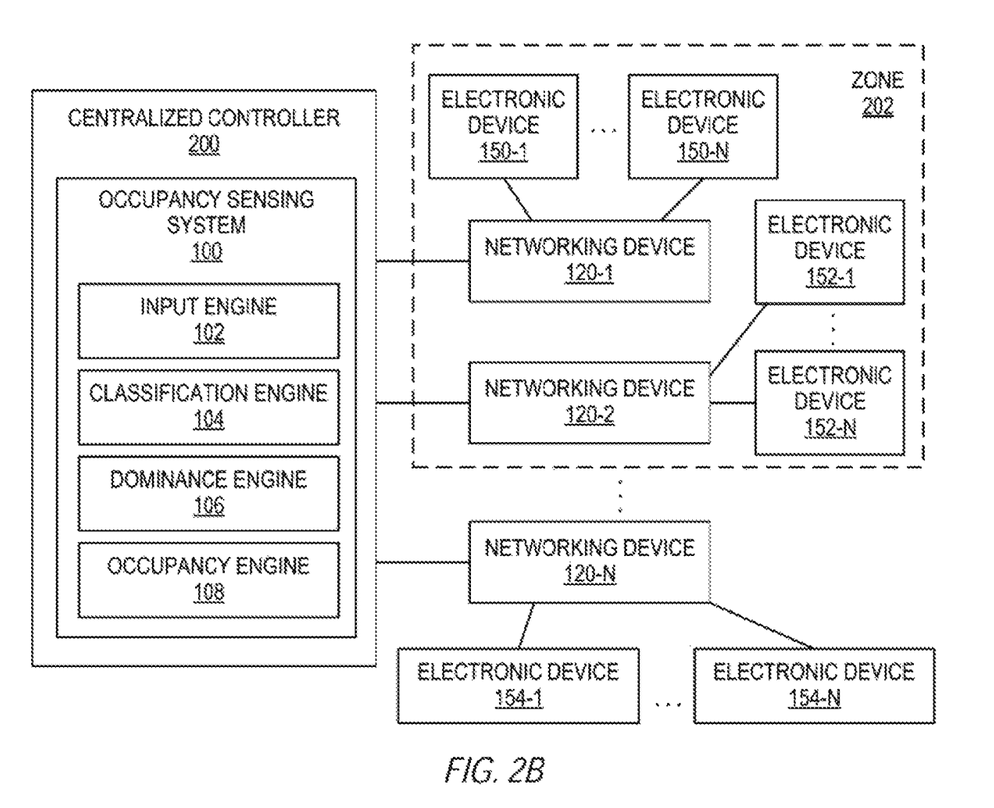
FIG. 2B is a block diagram of an example occupancy sensing system, according to another implementation.

FIG. 2B is an example of the occupancy sensing system 100, according to another example implementation. In FIG. 2B, the occupancy sensing system 100 (i.e., the input engine 102, the classification engine 104, the dominance engine 106, and the occupancy engine 108) may be included within a centralized controller 200 that manages a plurality of networking devices 120-1 through 120-N, each of which may be analogous to the networking device 120 described above with respect to FIG. 1. Each of the networking devices 120-1 through 120-N may communicate with electronic devices. For example, in the illustration of FIG. 2B, electronic devices 150-1 through 150-N may connect to the networking device 120-1, electronic devices 152-1 through 152-N may connect to the networking device 120-2, and electronic devices 154-1 through 154-N may connect to the networking device 120-N. Each of the electronic devices 150-1 through 150-N, 152-1 through 152-N, 154-1 through 154-N may be analogous to the electronic devices 150-1 through 150-N described above with respect to FIG. 1. A centralized controller 200 may be employed, for example, in a larger office building or the like, where multiple networking devices may be useful for providing network access throughout the building.

As with the networking device 120, each of the networking devices 120-1 through 120-N may monitor connection data or traffic data of connecting electronic devices. In turn, the networking devices 120-1 through 120-N may each transmit respective connection data or traffic data to the centralized controller 200. Accordingly, the centralized controller 200 may receive connection data or traffic data for all electronic devices that connect to networking devices managed by the centralized controller 200. The input engine 102 thus collects connection data and traffic data related to each of the electronic devices 150-1 through 150-N, 152-1 through 152-N, 154-1 through 154-N via the networking devices 120-1 through 120-N and the centralized controller 200. The connection data and the traffic data may be stored in an indexed database (in memory or storage of the centralized controller 200 of the occupancy sensing system 100, for example) so that data may be identified as originating from a particular one of the electronic devices or a particular one of the networking devices. In a manner analogous to that described above with respect to FIG. 1, the classification engine 104, the dominance engine 106, and the occupancy engine 108 may work in concert to generate an occupancy value for individual ones of the networking devices 120-1 through 120-N, for various combinations of the networking devices 120-1 through 120-N, or for all of the networking devices 120-1 through 120-N in aggregate.

In some implementations, a zone may be logically defined as a group of networking devices. For example, as depicted in FIG. 2B, a zone 202 (dashed line rectangle) may be defined to include networking devices 120-1 and 120-2, but not networking device 120-N. In some examples, the occupancy sensing system 100 may provide a web-based configuration interface of other interface, by which a user may define a zone or zones. A zone may relate to a physical area that corresponds to coverage of the group of networking devices (e.g., in particular, coverage related to wireless signal strength). The occupancy engine 108 (or more generally, the occupancy sensing system 100) may determine an occupancy value for the zone based on a number of coactive devices that connect to the group of networking devices that defines that zone. For example, if a zone is defined to include the networking devices on a particular floor of a building exclusively, the occupancy sensing system 100 may determine an occupancy value using data from those networking devices, which in turn may be an estimate of the occupancy on that particular floor.

In some implementations, the occupancy sensing system 100 may request or receive localization information that localizes at least some electronic devices within a zone based on signal strength. For example, at least some of the networking devices 120-1 through 120-N or the electronic devices 150-1 through 150-N, 152-1 through 152-N, 154-1 through 154-N may perform signal strength-based localization using various methods, such as triangulation, Monte Carlo localization with Bayesian filtering, or other methods. The occupancy sensing system 100 may subdivide a zone into different locations, based on the localization information, or may permit a user to divide the zone into different locations via a web-based configuration interface or the like. The occupancy sensing system 100 may then determine an occupancy value for each of the different locations of the zone by analyzing connection data and traffic data of electronic devices that are in the same one of the different locations according to the localization information.

Figure 3:
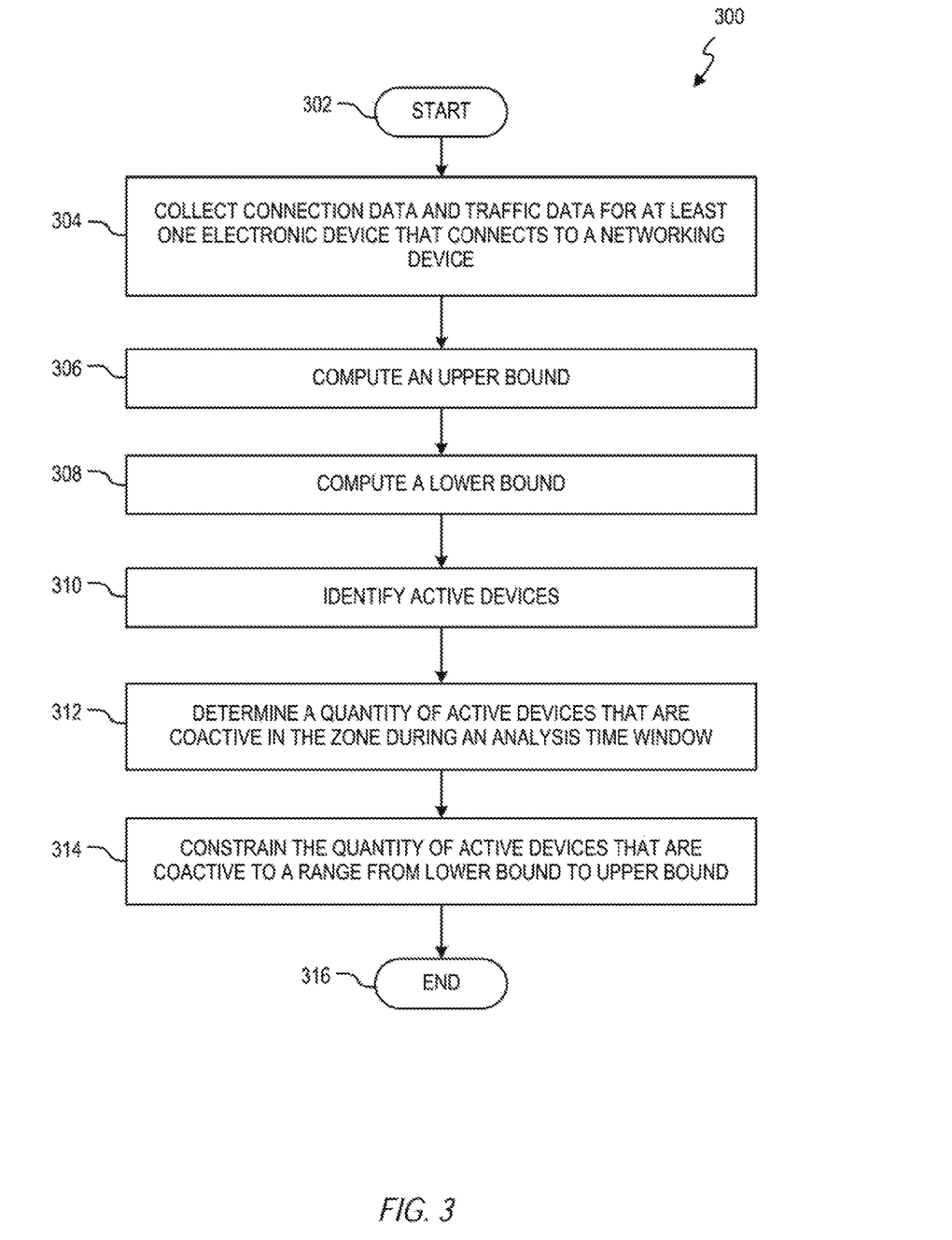
FIG. 3 is a flowchart of an example method for generating an occupancy value, according to an implementation.

FIG. 3 is a flowchart of an example method 300 for generating an occupancy value, according to an implementation. Method 300 may be described below as being executed or performed by the occupancy sensing system 100 described above in connection with FIG. 1. Various other suitable systems may be used as well, such as, for example, the occupancy sensing system 100 as configured in FIG. 2A or FIG. 2B. Method 300 may be implemented in the form of executable instructions stored on a machine-readable storage medium and executed by at least one processor of the occupancy sensing system 100, and/or in the form of electronic circuitry. In some implementations of the present disclosure, one or more blocks of method 300 may be executed substantially concurrently or in a different order than shown in FIG. 3. In some implementations of the present disclosure, method 300 may include more or less blocks than are shown in FIG. 3. In some implementations, one or more of the blocks of method 300 may, at certain times, be ongoing and/or may repeat.

The method 300 may begin at block 302, and continue to block 304, where the occupancy sensing system 100 may collect, from a networking device (e.g., 120), connection data and traffic data for at least one electronic device (e.g., any of 150-1 through 150-N) that connects to the networking device. In some implementations, block 304 may be performed by the input engine 102. In some implementations, the networking device may be associated with a zone (e.g., 202). As described above with respect to FIG. 2B, a zone may be logically defined as a group of networking devices (e.g., from among a plurality of networking devices 120-1 through 120-N).

At block 306, the occupancy sensing system 100 may compute an upper bound that is a quantity of electronic devices (e.g., from among 150-1 through 150-N) that connect to the networking device (e.g., 120), according to at least the connection data, with greater frequency or duration than others of the electronic devices. In other words, the occupancy sensing system 100 may determine a number of resident devices. In some implementations, block 306 may be performed by the classification engine 104 as described above. For example, electronic devices that connect to the networking device may be classified as a resident device or a transient device by comparing connection frequency or connection duration against a threshold, within a particular time window.

At block 308, the occupancy sensing system 100 may compute a lower bound that is a quantity of electronic devices (e.g., from among 150-1 through 150-N) that together generate a predetermined percentage of traffic at the networking device. In some implementations, block 308 may be performed by the dominance engine 106 as described above.

At block 310, the occupancy sensing system 100 may identify active devices that are electronic devices (e.g., from among 150-1 through 150-N) that connect to the networking device (e.g., 120) with respective traffic data exceeding a background activity traffic threshold. In some implementations, block 310 may be performed by the occupancy engine 108 as described above.

At block 312, the occupancy sensing system 100 may determine a quantity of the active devices that are coactive (that is, the quantity of coactive devices) in the zone during an analysis time window. In some implementations, block 312 may be performed by the occupancy engine 108 as described above. In particular, as described above with respect to FIG. 1, the occupancy engine 108 may determine the quantity of coactive devices by employing an association rule miner to calculate support values (e.g., support or a support count) for combinations of the active devices over a plurality of sampling time windows within the analysis time window. The occupancy engine 108 may use a quantity of a combination of the active devices having a highest support value as the quantity of coactive devices.

At block 314, the occupancy sensing system 100 may constrain the quantity of active devices that are coactive (determined at block 312) to a range from the lower bound (computed at block 308) to the upper bound (computed at block 306) to generate an occupancy value. In some implementations, block 314 may be performed by the occupancy engine 108 as described above. The method 600 may end at block 614.

Figure 4:
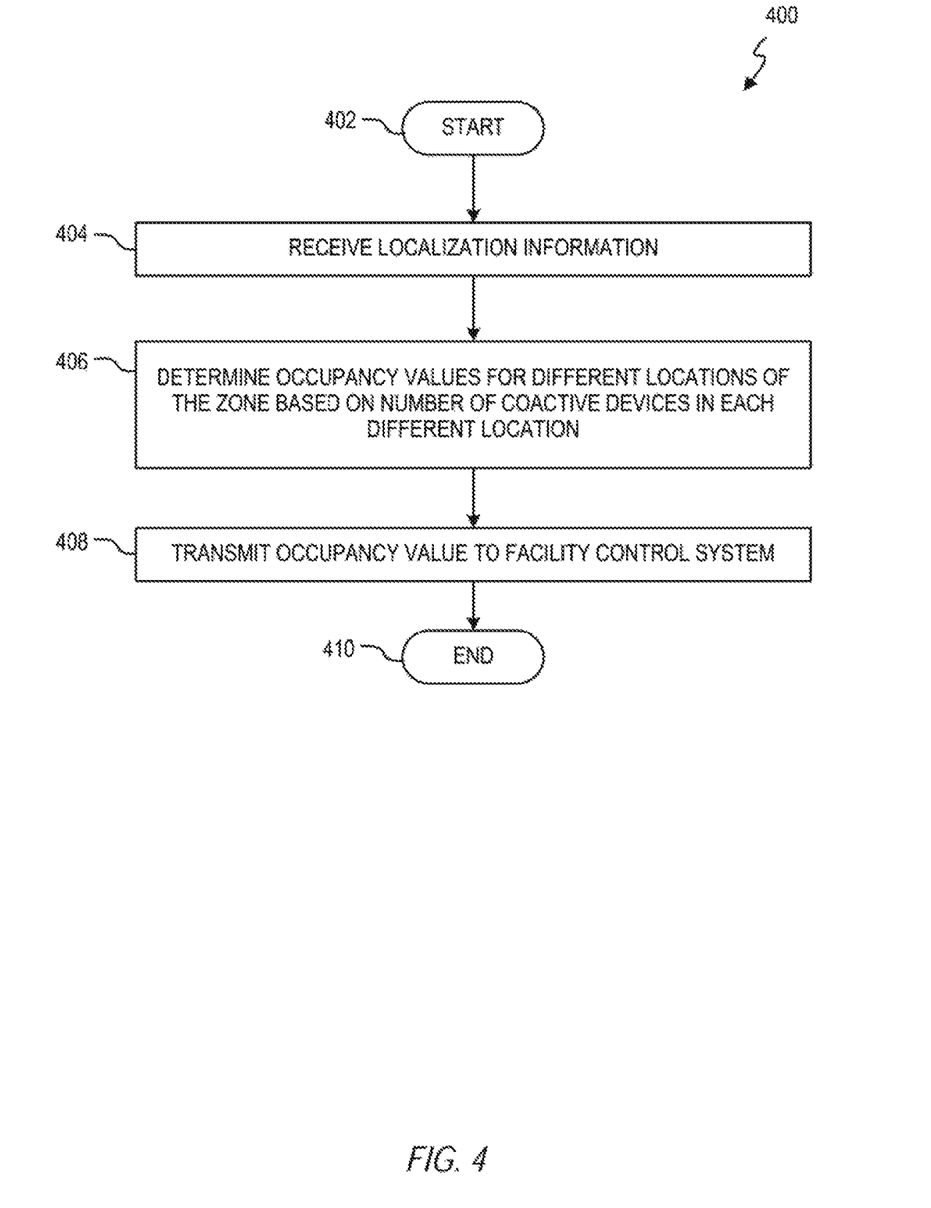
FIG. 4 is a flowchart of an example method for determining occupancy values for different locations within a zone, according to an implementation.

FIG. 4 is a flowchart of an example method 400 for determining occupancy values for different locations within a zone, according to an implementation. Method 400 may be described below as being executed or performed by the occupancy sensing system 100, and in particular, the occupancy sensing system 100 as arranged in FIG. 2B. Various other arrangements of the occupancy sensing system 100 may be used as well. Method 400 may be implemented in the form of executable instructions stored on a machine-readable storage medium and executed by at least one processor of the occupancy sensing system 100, and/or in the form of electronic circuitry. In some implementations of the present disclosure, one or more blocks of method 400 may be executed substantially concurrently or in a different order than shown in FIG. 4. In some implementations of the present disclosure, method 400 may include more or less blocks than are shown in FIG. 4. In some implementations, one or more of the blocks of method 400 may, at certain times, be ongoing and/or may repeat. In some implementations, method 400 may incorporate some blocks of method 300.

The method 400 may begin at block 402, and at block 404, the occupancy sensing system 100 may receive localization information that localizes at least some of the electronic devices that connect to a networking device (e.g., at least some of 150-1 through 150-N, 152-1 through 152-N) within a zone (e.g., 202) based on signal strength. The zone, which is defined as a group of networking devices (e.g., 120-1, 120-2) may include or be subdivided into different locations.

At block 406, the occupancy sensing system 100 may determine occupancy values for each of the different locations of the zone based on the localization information and a number of coactive devices in each of the different locations. For example, the localization information may associate at least some of the electronic devices with locations within the zone. For each location within the zone, the occupancy sensing system 100 may collect connection data and traffic data (e.g., in a manner analogous to block 304) for electronic devices associated that location, compute an upper bound (e.g., in a manner analogous to block 306), compute a lower bound (e.g., in a manner analogous to block 308), identify active devices (e.g., in a manner analogous to block 310), determine a quantity of coactive devices (e.g., in a manner analogous to block 312), and constrain the quantity of coactive devices to a range from the lower bound to the upper bound to generate an occupancy value for the location (e.g., in a manner analogous to block 314).

At block 408, the occupancy sensing system 100 may transmit an occupancy value (generated by block 406, or by block 314 of method 300) to a facility control system that manages at least some aspects of energy consumption or security in the zone. In response to the occupancy value, the facility control system may, for example, manage HVAC systems, lighting systems, information technology systems, or the like. In other examples, the facility control system may activate security protocols, such as triggering an alarm if the occupancy value does not meet an expected value (e.g., a low occupancy value may be expected after work hours) or locking doors if a building is determined to be unoccupied. After block 408, the method 400 may end at block 410.

Figure 5:
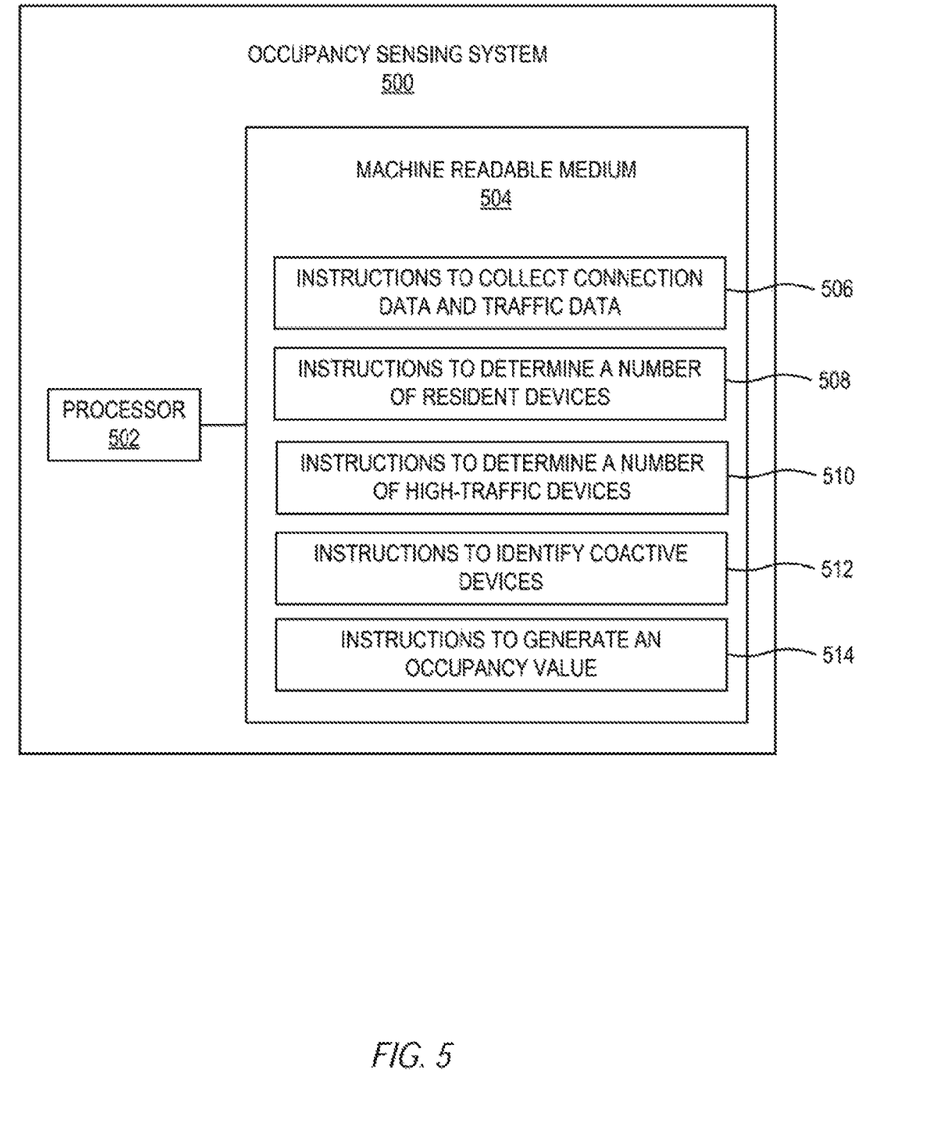
FIG. 5 is a block diagram of an example occupancy sensing system that includes a non-transitory, machine-readable medium encoded with instructions to generate an occupancy value, according to an implementation.

FIG. 5 is a block diagram illustrating an occupancy sensing system 500 that includes a machine-readable medium encoded with example instructions to generate an occupancy value. In some implementations, the occupancy sensing system 500 may serve as or form part of the occupancy sensing system 100 depicted in FIG. 1, 2A, or 2B. In some implementations, the occupancy sensing system 500 may include at least one processor 502 coupled to a machine-readable medium 504.

The processor 502 may include a single-core processor, a multi-core processor, an application-specific integrated circuit, a field programmable gate array, and/or other hardware device suitable for retrieval and/or execution of instructions from the machine-readable medium 504 (e.g., instructions 506, 508, 510, 512, 514) to perform functions related to various examples. Additionally or alternatively, the processor 502 may include electronic circuitry for performing the functionality described herein, including, but not limited to, the functionality of instructions 506, 508, 510, 512, and/or 514. With respect to the executable instructions represented as boxes in FIG. 5, it should be understood that part or all of the executable instructions and/or electronic circuits included within one box may, in alternate implementations, be included in a different box shown in the figures or in a different box not shown.

The machine-readable medium 504 may be any medium suitable for storing executable instructions, such as random access memory (RAM), electrically erasable programmable read-only memory (EEPROM), flash memory, hard disk drives, optical discs, or the like. In some example implementations, the machine-readable medium 504 may be a tangible, non-transitory medium, where the term "non-transitory" does not encompass transitory propagating signals. The machine-readable medium 504 may be disposed within the occupancy sensing system 500, as shown in FIG. 5, in which case the executable instructions may be deemed "installed" or "embedded" on the occupancy sensing system 500. Alternatively, the machine-readable medium 504 may be a portable (e.g., external) storage medium, for example, that allows the occupancy sensing system 500 to remotely execute the instructions or download the instructions from the storage medium. In this case, the executable instructions may be part of an "installation package." As described further herein below, the machine-readable medium 504 may be encoded with a set of executable instructions 506, 508, 510, 512, 514.

Instructions 506, when executed by the processor 502, may collect, from a networking device, connection data and traffic data related to electronic devices that connect to the networking device. Instructions 508, when executed by the processor 502, may determine a number of resident devices, which may be defined as those of the electronic devices that connect to the networking device, based on the connection data, with greater frequency or duration than others of the electronic devices. Instructions 510, when executed by the processor 502, may determine a number of high-traffic devices, by determining a minimum number of the electronic devices that collectively generate a predetermined percentage of traffic at the networking device. Instructions 512, when executed by the processor 502, may identify, in an analysis time window, coactive devices from among electronic devices that actively connect to the networking device with respective traffic data exceeding a background activity traffic threshold. Instructions 514, when executed by the processor 502, may generate an occupancy value that is a number of the coactive devices (e.g., identified by instructions 512) constrained to a range from the number of resident devices (e.g., determined by instructions 508) to the number of high-traffic devices (e.g., determined by instructions 510).

In view of the foregoing description, it can be appreciated that connection data and traffic data collected implicitly by a networking device with respect to user's electronic devices may be leveraged to determine or estimate occupancy of a physical location, and more particularly, without resorting to specialized sensors, dedicated hardware, modifications to existing network infrastructure, or costly data sampling and processing routines. By virtue of configuring zones and/or incorporating localization information, an occupancy sensing system according to the foregoing description may be useful for determining or estimating occupancy in a variety of configurations of physical space.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

We claim:

1. An occupancy sensing system comprising:
   a hardware processor; and
   a non-transitory machine-readable medium storing instructions that, when executed, cause the hardware processor to:
   collect, from a networking device, connection data and traffic data related to electronic devices that connect to the networking device;

differentiate the electronic devices into resident devices and transient devices based on the connection data and to determine a number of the resident devices;

determine a number of high-traffic devices among the electronic devices based on the traffic data; and determine a number of the electronic devices that are coactive in an analysis time window, and to determine an occupancy value that is the number of electronic devices that are coactive bounded in a range from the number of resident devices to the number of high-traffic devices.

2. The occupancy sensing system of claim 1, wherein to determine the number of electronic devices that are coactive, the instructions cause the hardware processor to:

identify active devices to be electronic devices that have traffic data above a background activity threshold, calculate frequencies of coactivity of combinations of the active devices over a plurality of sampling time windows within the analysis time window, and select a combination of active devices having a highest frequency of coactivity among the combinations, the number of electronic devices that are coactive being set to the number of electronic devices in the selected combination of active devices having the highest frequency of coactivity.

3. The occupancy sensing system of claim 1, wherein the instructions, when executed, cause the hardware processor to classify as resident devices the electronic devices for which corresponding connection data indicates frequency or duration of connection to the networking device exceed predetermined frequency or duration thresholds.

4. The occupancy sensing system of claim 1, wherein the instructions, when executed, cause the hardware processor to compute, as the number of high-traffic devices, a minimum number of the electronic devices having traffic data that together account for a threshold percentage of total traffic at the networking device.

5. The occupancy sensing system of claim 1, wherein if the number of coactive devices is greater than the number of resident devices, the occupancy value is set to the number of resident devices, and if the number of coactive devices is less than the number of high-traffic devices, the occupancy value is set to the number of high-traffic devices.

6. The occupancy sensing system of claim 1, wherein a zone is logically defined as a group of networking devices, the zone relates to a physical area corresponding to coverage of the group of networking devices, and the instructions, when executed, cause the hardware processor to determine an occupancy value for the zone based on a number of coactive devices that connect to the group of networking devices.

7. The occupancy sensing system of claim 1, wherein the electronic devices include wired devices, wireless devices, or wired devices and wireless devices, and the networking device includes an access point, a gateway, or a router.

8. The occupancy sensing system of claim 1, wherein the hardware processor and the non-transitory machine-readable medium are included in the networking device.

9. The occupancy sensing system of claim 1, wherein the hardware processor and the non-transitory machine-readable medium are included in a centralized controller that manages a plurality of networking devices.

10. A method comprising:

collecting, by an occupancy sensing system from a networking device associated with a zone, connection data and traffic data for electronic devices that connect to the networking device;

computing, by the occupancy sensing system:

an upper bound that is a quantity of electronic devices that connect to the networking device, according to the connection data, with greater frequency or duration than others of the electronic devices, and a lower bound that is a quantity of electronic devices that together generate a predetermined percentage of traffic at the networking device;

identifying, by the occupancy sensing system, active devices that are electronic devices that connect to the networking device with respective traffic data exceeding a background activity traffic threshold;

determining, by the occupancy sensing system, a quantity of active devices that are coactive in the zone during an analysis time window; and constraining, by the occupancy sensing system, the quantity of active devices that are coactive to a range from the lower bound to the upper bound to generate an occupancy value.

11. The method of claim 10, wherein the determining the quantity of active devices that are coactive includes:

employing an association rule miner to calculate support values for combinations of the active devices over a plurality of sampling time windows within the analysis time window, and using a quantity of a combination of the active devices having a highest support value as the quantity of active devices that are coactive.

12. The method of claim 10, further comprising:

receiving localization information that localizes at least some of the electronic devices within the zone based on signal strength, the zone including different locations; and determining occupancy values for each of the different locations based on the localization information and a number of coactive devices in each of the different locations.

13. The method of claim 10, further comprising transmitting the occupancy value to a facility control system that manages aspects of energy consumption or security in the zone.

14. The method of claim 10, further comprising:

setting the occupancy value to the quantity of electronic devices that connect to the networking device with greater frequency or duration than others of the electronic devices, if the quantity of devices that are coactive devices is greater than the quantity of electronic devices that connect to the networking device with greater frequency or duration than others of the electronic devices; and setting the occupancy value to the quantity of electronic devices that together generate the predetermined percentage of traffic at the networking device, if the quantity of devices that are coactive devices is less than the quantity of electronic devices that together generate the predetermined percentage of traffic at the networking device.

15. A non-transitory machine-readable medium, storing instructions executable by a processor of an occupancy sensing system, the non-transitory machine-readable medium comprising:

instructions to collect, from a networking device, connection data and traffic data related to electronic devices that connect to the networking device;

instructions to determine a number of resident devices that are electronic devices that connect to the networking device, based on the connection data, with greater frequency or duration than others of the electronic devices;

instructions to determine a number of high-traffic devices that is a minimum number of electronic devices that collectively generate a predetermined percentage of traffic at the networking device;

instructions to identify, in an analysis time window, coactive devices from among electronic devices that actively connect to the networking device with respective traffic data exceeding a background activity traffic threshold; and instructions to generate an occupancy value that is a number of the coactive devices constrained to a range from the number of resident devices to the number of high-traffic devices.

16. The non-transitory machine-readable medium of claim 15, wherein the instructions to determine coactive devices includes an association rule miner to:

calculate support values for combinations of electronic devices that actively connect to the networking device over a plurality of sampling time windows within the analysis time window, and select a combination of electronic devices having a highest support value as the coactive devices.

17. The non-transitory machine-readable medium of claim 15, wherein the instructions to generate the occupancy value include:

instructions to set the occupancy value to the number of resident devices, if a number of the coactive devices is greater than the number of resident devices; and instructions to set the occupancy value to the number of high-traffic devices, if the number of the coactive devices is less than the number of high-traffic devices.

18. The non-transitory machine-readable medium of claim 15, further comprising instructions to transmit the occupancy value to a facility control system that manages aspects of energy consumption or security in a zone associated with the network device.

19. The non-transitory machine-readable medium of claim 15, further comprising:

instructions to receive localization information that localizes at least some of the electronic devices within a zone based on signal strength, the zone including different locations; and instructions to determine occupancy values for each of the different locations based on the localization information and a number of coactive devices in each of the different locations.

20. The non-transitory machine-readable medium of claim 15, wherein the processor is included in a centralized controller that manages a plurality of networking devices.

* * * * *